United States Patent

Huang

(10) Patent No.: US 8,235,608 B2
(45) Date of Patent: Aug. 7, 2012

(54) CAMERA MODULE

(75) Inventor: Chien-Feng Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 14 days.

(21) Appl. No.: 12/979,351

(22) Filed: Dec. 28, 2010

(65) Prior Publication Data

US 2012/0148228 A1    Jun. 14, 2012

(30) Foreign Application Priority Data

Dec. 10, 2010    (TW) ............................... 99143286 A

(51) Int. Cl.
*G03B 17/00*    (2006.01)

(52) U.S. Cl. ...................................................... 396/529

(58) Field of Classification Search .................. 396/529, 396/535
See application file for complete search history.

(56) References Cited

U.S. PATENT DOCUMENTS

| | | | | |
|---|---|---|---|---|
| 5,768,649 | A * | 6/1998 | Pearson | 396/529 |
| 7,422,382 | B2 * | 9/2008 | Seo | 396/529 |
| 2005/0219399 | A1 * | 10/2005 | Sato et al. | 348/340 |
| 2005/0248684 | A1 * | 11/2005 | Machida | 348/373 |
| 2007/0189765 | A1 * | 8/2007 | Schulte | 396/529 |
| 2009/0324213 | A1 * | 12/2009 | Wang | 396/529 |
| 2011/0013077 | A1 * | 1/2011 | Okada | 348/373 |
| 2011/0037893 | A1 * | 2/2011 | Okada | 348/374 |
| 2012/0014688 | A1 * | 1/2012 | Ma | 396/535 |

* cited by examiner

*Primary Examiner* — W. B. Perkey
(74) *Attorney, Agent, or Firm* — Altis Law Group, Inc.

(57) ABSTRACT

A camera module includes a circuit board, an image sensor, a barrel, a lens holder, a base board, and a number of clamping elements. The circuit board has a mounting surface. The image sensor is mounted on the mounting surface of the circuit board and includes an image plane. The barrel has two lens received therein. The lens holder is coupled to the barrel and receives the image sensor. The base board is arranged around the lens holder, and the base board is attached to the lens holder and attached on the mounting surface of the circuit board. The clamping elements clamp the base board on the circuit board, such that an optical axis of the barrel is maintained substantially coaxially aligned with a normal of the image plane.

8 Claims, 5 Drawing Sheets

CAMERA MODULE

BACKGROUND

1. Technical Field

The disclosure generally relates to camera modules, and particularly to a camera module with a number of clamping elements.

2. Description of Related Art

Lens modules and image sensors are key components of camera modules. Generally, light beams from an object transmit through the lens module along a predetermined path and fall on a central region of the image sensor. When an image plane of the object is precisely on the image sensor (in such case, an optical axis of the lens modules is generally aligned with a normal of an image plane of the image sensor), a clear image is obtained. However, the shaking of the camera at the time that the image is being captured or during assembly of the camera modules causes the optical axis of lens module to incline slightly relative to the normal of the image plane. Due to imprecision between the optical axis of lens module and the normal image plane, a blurred image is captured.

Therefore, what is needed, is a camera module which can overcome the above shortcomings.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the camera module. Moreover, in the drawings, like reference numerals designate corresponding parts throughout the several views.

DETAILED DESCRIPTION

Embodiment of the camera module will now be described in detail below and with reference to the drawings.

Figure 1:
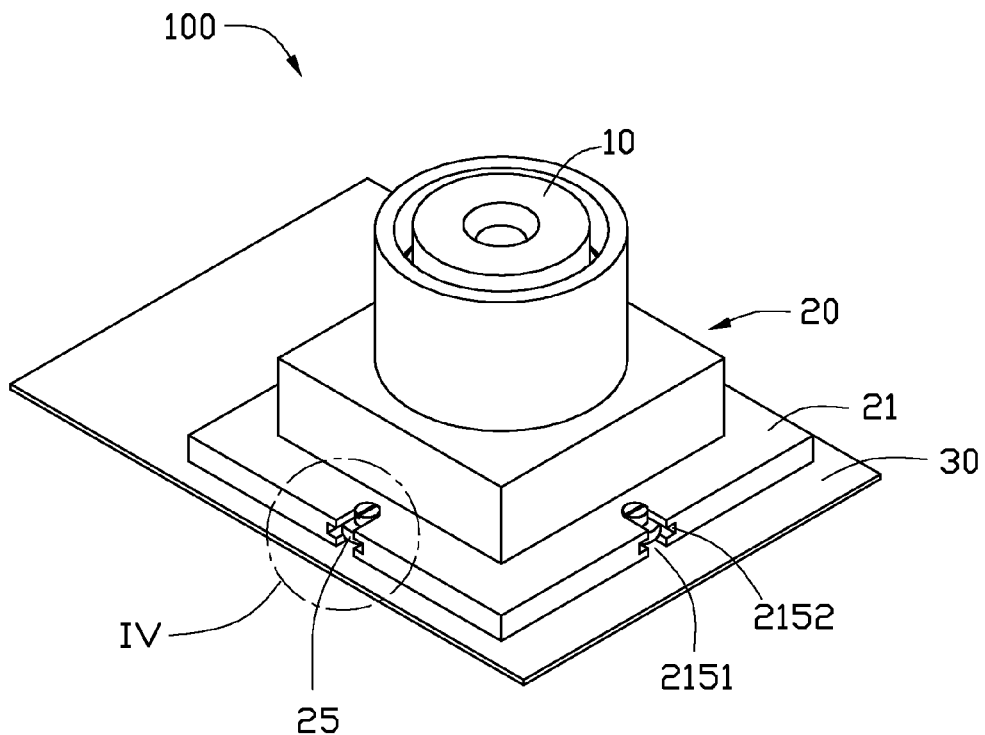
FIG. 1 is an isometric view of a camera module in accordance with an embodiment.

Referring to FIG. 1, a camera module 100 in accordance with an embodiment is shown. The camera module 100 includes a lens barrel 10, a lens holder 20, a base board 21, a circuit board 30, an image sensor 40, and a number of clamping elements 25.

Figure 2:
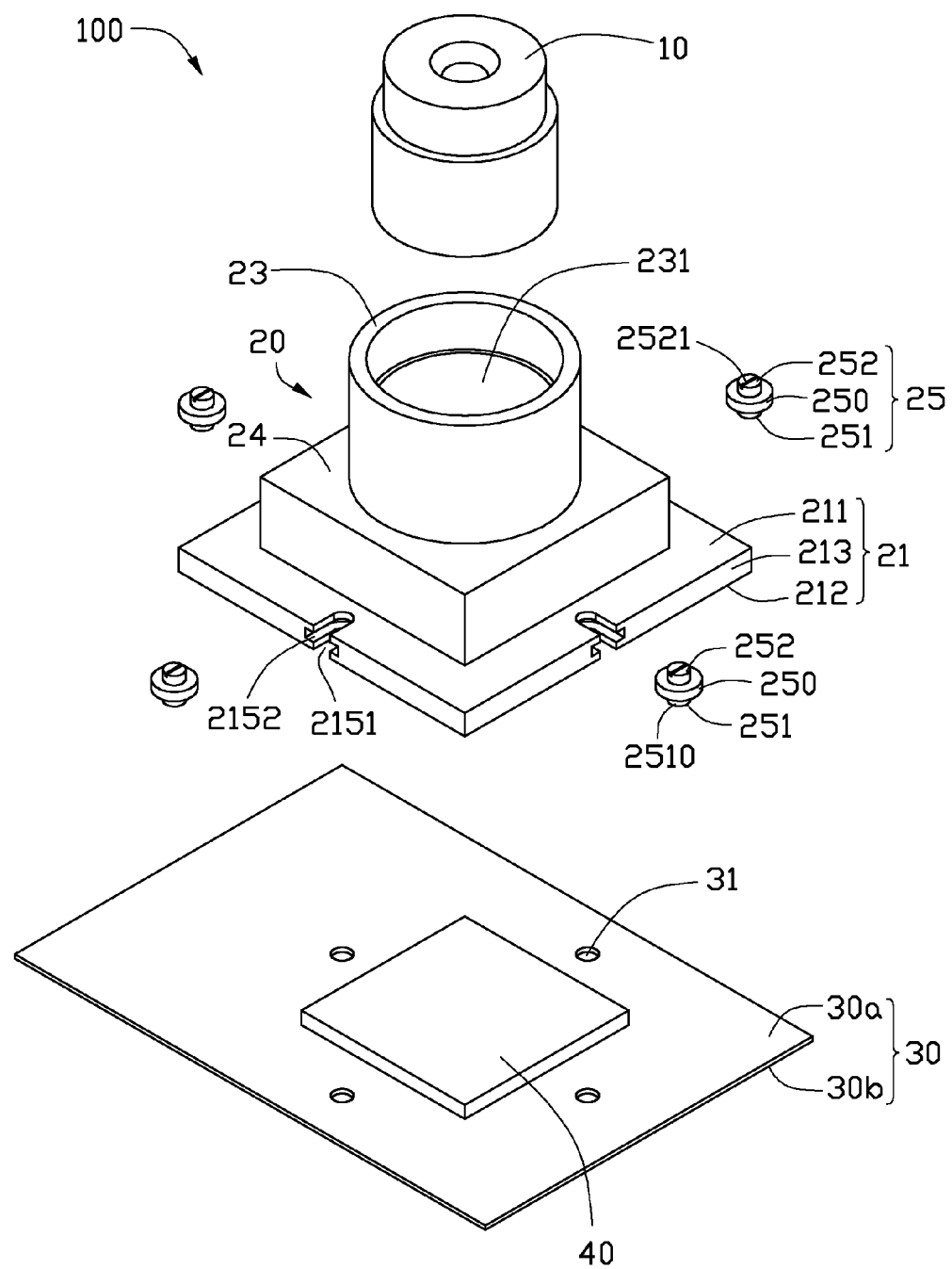
FIG. 2 is an exploded view of the camera module of FIG. 1.
Figure 3:
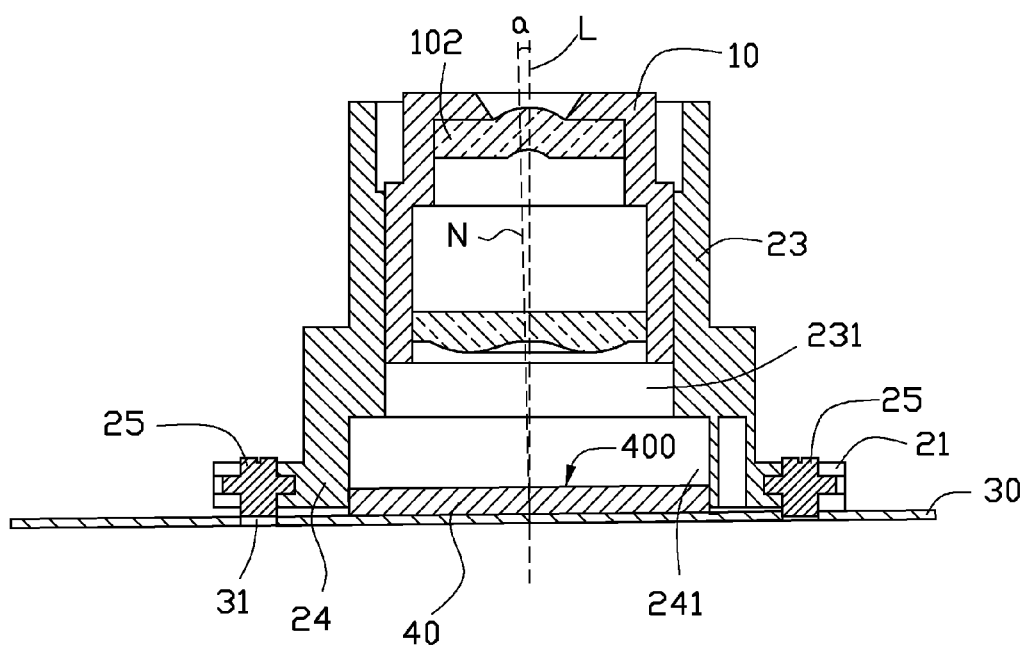
FIG. 3 is cross section of the camera module of FIG. 1, showing inclination of the camera module during assembly.

Referring to FIG. 2 and FIG. 3, in this embodiment, the barrel 10 is substantially a hollow cylinder. The barrel receives at least one or more lenses, for example two lenses 102 (see FIG. 3).

As shown in FIG. 2, the lens holder 20 includes a first portion 23 and a second portion 24. In this embodiment, the first portion 23 is substantially cylindrical. The second portion 24 is substantially cuboid. The first portion 23 extends from a side of the second portion 24, and has a first receiving hole 231 defined therein for receiving the lens barrel 10. The first receiving hole 231 is substantially cylindrical. As shown in FIG. 3, when the lens barrel 10 is received in the first receiving hole 231, a central axis of the first receiving hole 231 is coaxially aligned with an optical axis L of the lens barrel 10. The second portion 24 has a second receiving hole 241 defined therein for receiving the image sensor 40. The second receiving hole 241 may for example, be cuboid or cylindrical. A central axis of the second receiving hole 241 is coaxially aligned with the central axis of the first receiving hole 231. In this embodiment, when the image sensor 40 is received in the second receiving hole 241, the lenses 102 in the barrel 10 each face the image plane 400 of the image sensor 40, to be able to form a focused image on the image sensor 40. In alternative embodiments, the lens barrel 10 may further include a filter, such as an infrared-cut filter (IR-cut filter) received therein. The infrared-cut filter can be used to block transmission of infrared light to the image sensor 40.

The base board 21 is arranged around the second portion 24 of the holder 20. In this embodiment, the base board 21 is substantially cuboid-shaped, and is integrally connected to the second portion 24. For example, the base board 21 extends outward from a peripheral sidewall of the second portion 24. In alternative embodiments, the base board 21 and the holder 20 may be manufactured separately, and further attached to each other when in use. The base board 21 includes an upper surface 211 and a bottom surface 212 at opposite sides thereof, and four side surfaces 213 are sandwiched between the upper surface 211 and the bottom surface 212. The upper surface 211 and the bottom surface 212 are substantially parallel to each other. Each of the upper surface 211 and the bottom surface 212 is substantially rectangular. Each of the side surfaces 213 is substantially perpendicular to the upper surface 211 and the bottom surface 212.

Figure 4:
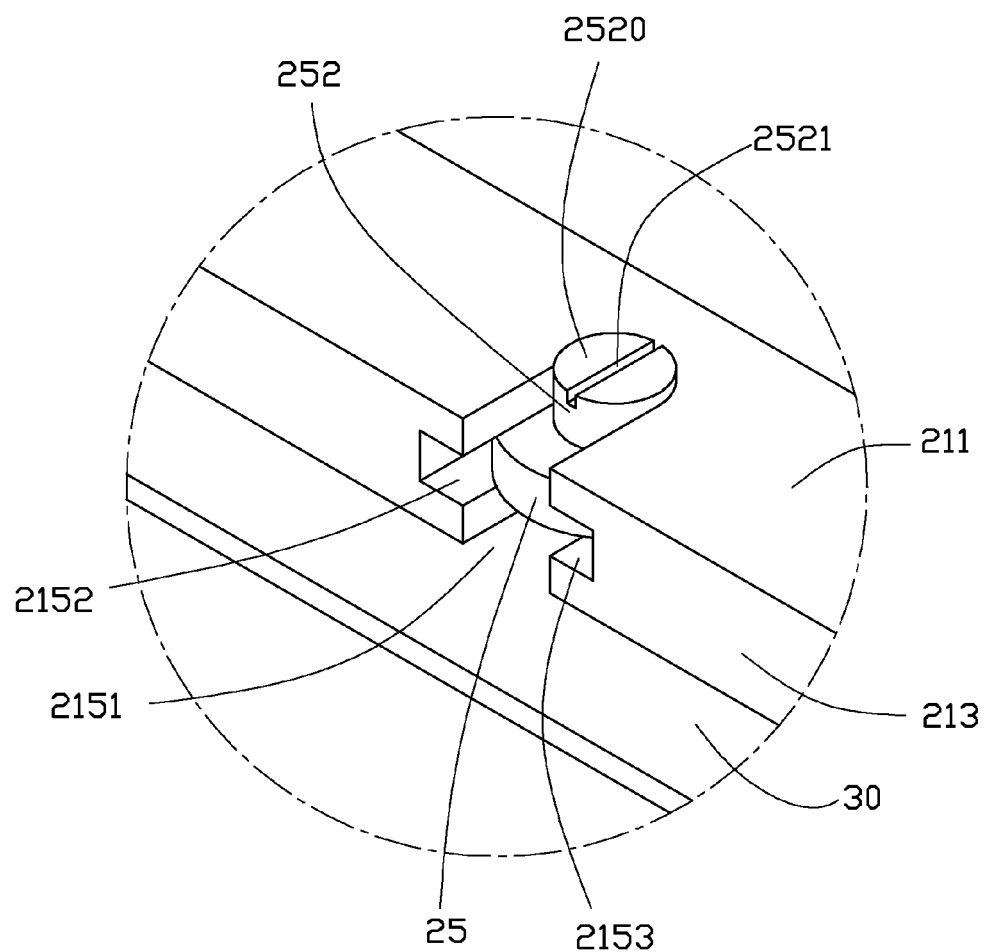
FIG. 4 an enlarged view of a circled portion IV of FIG. 1, showing a clamping element inserted in a first slot and a second slot.

Four first slots 2151 and four second slots 2152 are defined in the base board 21. In this embodiment, the four first slots 2151 are defined in four edge portions of the upper surface 211. The four second slots 2152 are defined in four respective side surfaces 213 to communicate with four respective first slots 2151. As shown in FIG. 4, the first slot 2151 and the second slot 2152 cooperatively form a cross-shaped configuration. The first slot 2151 is defined in the upper surface 211 and extends all the way through the bottom surface 212. In addition, the first slot 2151 is exposed at the side surface 213. The second slot 2152 is defined in the side surface 231 but is not extended through the upper surface 211 and the bottom surface 212. Moreover, the second slot 2152 intersects with the first slot 2151 to form a step 2153 therebetween, In this embodiment, the four first slots 2151 and the four second slots 2152 are equidistantly spaced from one another around the optical axis L of the barrel 10.

The camera module 100 includes four clamping elements 25. The four clamping elements 25 correspond to the four first slots 2151 and the four second slots 2152. As shown in FIG. 2 and FIG. 4, each clamping element 25 is shaped to conform to the corresponding first and second slots 2151 and 2152. The clamping element 25 includes a base portion 250, a connection portion 251, and an engaging portion 252. The connection portion 251 and the engaging portion 252 extend from opposite sides of the base portion 250. In this embodiment, each of the base portion 250, the connection portion 251, and the engaging portion 252 is substantially cylindrical. A diameter of the base portion 250 is greater than that of the connection portion 251 and the engaging portion 252. In addition, the connection portion 251 has external threads defined in a peripheral surface 2510 thereof. The engaging portion 252 has an engaging slot 2521 defined in an end surface 2520 thereof facing away from the connection portion 251.

The circuit board 30 includes a mounting surface 30a and a lower surface 30b (see FIG. 2) at opposite sides thereof. The image sensor 40 is mounted on the mounting surface 30a of the circuit board 30 by, for example surface mount technology (SMT). The holder 20 with the base board 21, as well as the lens barrel 10 is mounted on the circuit board 30 to secure the image sensor 40. In this embodiment, the four clamping elements 25 clamp the holder 20 on the mounting surface 30a of the circuit board 30. Such that the image sensor 40 is secured in the second hole 241 of the holder 20 (see FIG. 3).

The circuit board 30 has four holes 31 defined in the mounting surface 30a. The four holes 31 surround the image sensor 40. Each of the holes 31 has internal threads defined in an inner sidewall and extends all the way through the lower surface 30b. In assembly of the camera module 100, the four clamping elements 25 are first inserted in the respective first and second slots 2151 and 2152. Then the four clamping elements 25 are screwed into the four threaded holes 31 to clamp the holder 20 on the circuit board 30.

In this embodiment, as shown in FIG. 4, when the clamping element 25 is received in the first and second slots 2151 and 2152, the base portion 250 of the clamping element 25 contacts the step 2153 and engagingly received in the second slot 2152. The engaging portion 252 of the clamping element 25 is engagingly received in the first slot 2151. The connection portion 251 of the clamping element 25 protrudes from the bottom surface 212 to be received in the hole 31 of the circuit board 30, and the external threads of the connection portion 251 engage with the internal threads of the circuit board 30. The connection portions 251 of the clamping element 25 is threadedly coupled to the circuit board 30, and the base board 21 together with the holder 20 is clamped to the circuit board 30 by the clamping elements 25, as shown in FIG. 3.

In one example for illustrating the operation of the camera module 100, an electric current is applied to the image sensor 40 by, a power supply (not shown) mounted on the circuit board 30 for example. Light beams from an object transmit in an intended path through the lenses 102 in the barrel 10 to arrive at a central region of the image plane 400. The image sensor 40 senses the light beams, thus generating a clear image of the object.

Referring to FIG. 3, in another example, an optical axis L of the barrel 10 may be inclined relative to a normal N of the image plane 400 during assembly of the camera module 100, or as shaking of the camera module 100 occurs. An inclination α is generated between the optical axis L and the normal N. In such state, if no correction were made to compensate the inclination α, the light beams from the object would fall on a region of the image plane 400 deviated from the central region of the image sensor 40, and generate a blurred image on the image sensor 40. In one typical example, corrections for compensating the inclination α are made by adjusting an depth of the connection portion 251 of each clamping element 25 engaged in the hole 31. The adjustment is made by, rotating the clamping element 25 using a screwdriver (not shown) for example. In operation, the screwdriver engages in the engaging slot 2521 when it rotates the clamping element 25.

Figure 5:
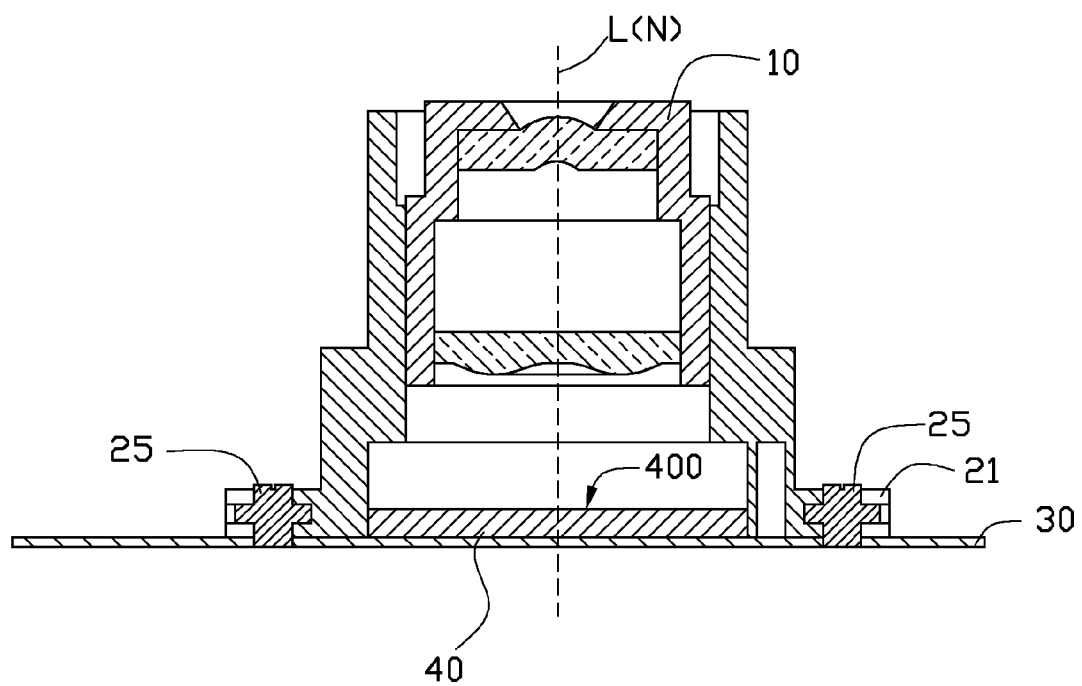
FIG. 5 is similar to FIG. 3, but showing correction of the inclination.

As shown in FIG. 5, when the inclination α is compensated, the optical axis L and the normal N are coaxially aligned with each other. In operation, light beams from the object can fall on the central region of the image plane 400, and accordingly generates a blurred image on the image sensor 40.

In alternative embodiments, the base board 21 need not have the second slots 2152 defined therein. In such case, the clamping element 25 can be conformed to the first slot 2151, and the holder 20 can be clamped on the circuit board 30 by engaging the clamping elements 25 in the first slots 2151 and the holes 31. In addition, the engaging slot 2521 of the engaging portion 252 can be in the form of a cross-shaped configuration.

It is understood that the above-described embodiment are intended to illustrate rather than limit the disclosure. Variations may be made to the embodiment without departing from the spirit of the disclosure. Accordingly, it is appropriate that the appended claims be construed broadly and in a manner consistent with the scope of the disclosure.

What is claimed is:

1. A camera module comprising:
a circuit board having a mounting surface, the circuit board having a plurality of holes defined in the mounting surface;
an image sensor mounted on the mounting surface of the circuit board, the image sensor comprising an image plane;
a barrel;
at least one lens received in the barrel;
a lens holder coupled to the barrel, the lens holder receiving the image sensor;
a base board arranged around the lens holder, the base board being attached to the lens holder and attached on the mounting surface of the circuit board, the base board having a plurality of first slots defined in an upper surface thereof facing away from the mounting surface, the first slots extending through a bottom surface of the base board opposite to the upper surface; and
a plurality of clamping elements engaged in the respective first slots and the respective holes and configured for clamping the base board on the circuit board such that an optical axis of the barrel is maintained substantially coaxially aligned with a normal of the image plane.

2. The camera module of claim 1, wherein the base board is cuboid-shaped and comprises four edge portions around the lens holder, the plurality of clamping elements comprises four clamping elements respectively arranged at the four edge portions of the base board.

3. The camera module of claim 1, wherein the first slots are equidistantly spaced from one another around the optical axis of the barrel.

4. The camera module of claim 1, wherein the base board has four side surfaces connected between the upper surface and the bottom surface; the base board has a plurality of second slots defined in the side surfaces, each of the second slots intersects and communicates with a respective one of the first slots to form a step therebetween, each of the first slots is exposed out of a respective one of the side surfaces, each of the clamping element comprises a board base portion, a connection portion, and an engaging portion, the connection portion and the engaging portion extend from opposite sides of the base portion, each clamping element is inserted into corresponding first and second slots, with the base portion thereof contacting the step of the corresponding first and second slots and the connection portion thereof engaged in a corresponding hole of the circuit board.

5. The camera module of claim 4, wherein each engaging portion has an engaging slot defined in an end surface thereof facing away from the connection portion.

6. The camera module of claim 4, wherein the connection portion is threadedly coupled in the corresponding hole of the circuit board.

7. The camera module of claim 4, wherein each first slot and a corresponding second slot are arranged in a cross-shaped configuration.

8. The camera module of claim 1, wherein the base board and the lens holder are integrally connected to each other.

* * * * *